United States Patent
Ovesjö et al.

(10) Patent No.: US 12,464,428 B1
(45) Date of Patent: Nov. 4, 2025

(54) METHODS AND DEVICES FOR FACILITATING AN INTER-RAT HANDOVER

(71) Applicant: Telefonaktiebolaget LM Ericsson (publ), Stockholm (SE)

(72) Inventors: Fredrik Ovesjö, Stockholm (SE); Tao Cui, Stockholm (SE); Josefin Karlsson, Gothenburg (SE); Stefan Granlund, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/203,911

(22) Filed: May 9, 2025

Related U.S. Application Data

(63) Continuation-in-part of application No. PCT/SE2025/050167, filed on Feb. 24, 2025.

(60) Provisional application No. 63/721,807, filed on Nov. 18, 2024.

(51) Int. Cl.
  *H04W 8/24* (2009.01)
  *H04W 36/14* (2009.01)
  *H04W 88/06* (2009.01)

(52) U.S. Cl.
  CPC ........... *H04W 36/144* (2023.05); *H04W 8/24* (2013.01); *H04W 88/06* (2013.01)

(58) Field of Classification Search
  CPC ...... H04W 36/144; H04W 8/24; H04W 88/06
  See application file for complete search history.

(56) References Cited

U.S. PATENT DOCUMENTS

| | | | |
|---|---|---|---|
| 9,137,741 B2* | 9/2015 | Park | H04W 48/16 |
| 2008/0014957 A1* | 1/2008 | Ore | H04W 36/0088 |
| | | | 455/452.1 |
| 2013/0260745 A1* | 10/2013 | Johansson | H04W 36/144 |
| | | | 455/423 |
| 2018/0227737 A1 | 8/2018 | Wu | |
| 2020/0314932 A1* | 10/2020 | Jin | H04W 8/24 |
| 2024/0048967 A1 | 2/2024 | Palat et al. | |
| 2024/0064505 A1* | 2/2024 | Liang | H04W 8/24 |

(Continued)

FOREIGN PATENT DOCUMENTS

| | | | | |
|---|---|---|---|---|
| WO | WO-2013165285 A1 * | 11/2013 | | H04W 24/10 |
| WO | WO-2020152009 A1 * | 7/2020 | | H04W 48/18 |

OTHER PUBLICATIONS

3GPP TSG-RAN WG2 Meeting #127bis, "Network signalling of maximum number of UL segments," Qualcomm Incorporated, AT&T, R2-2408371, Hefei, China, Oct. 14-18, 2024, 3 pages.

(Continued)

*Primary Examiner* — Julio R Perez
(74) *Attorney, Agent, or Firm* — Sage Patent Group

(57) ABSTRACT

A user equipment (UE), which is operable in EUTRA networks and in NR networks, can perform a capability transfer procedure. The UE can compile EUTRA capabilities of the UE. The UE can further compile NR capabilities of the UE. The UE can transmit one or more UE capability information messages with the compiled EUTRA capabilities and NR capabilities to a base station in an EUTRA network, characterized in that the NR capabilities are compiled subject to a capability size limit, which corresponds to a supported size of a container in a handover message sent on an inter-RAT interface between Evolved Packet Core and 5G Core.

20 Claims, 5 Drawing Sheets

(56) References Cited

U.S. PATENT DOCUMENTS

2024/0064786 A1* 2/2024 Jin .................. H04W 76/15

OTHER PUBLICATIONS

3GPP TS 29.274 V18.7.0, 3rd Generation Partnership Project, Technical Specification Group Core Network and Terminals, 3GPP Evolved Packet System (EPS), Evolved General Packet Radio Service (GPRS), Tunnelling Protocol for Control plane (GTPv2-C); Stage 3; (Release 18), Jun. 2024, Valbonne, France, 429 pages.

3GPP TS 38.413 V18.3.0, 3rd Generation Partnership Project, Technical Specification Group Radio Access Network; NG-RAN; NG Application Protocol (NGAP) (Release 18), Sep. 2024, Valbonne, France, 389 pages.

3GPP TS 38.331 V18.3.0, 3rd Generation Partnership Project, Technical Specification Group Radio Access Network; NR; Radio Resource Control (RRC) protocol specification (Release 18), Sep. 2024, Valbonne, France, 1694 pages.

3GPP TS 36.413 V18.2.0, 3rd Generation Partnership Project, Technical Specification Group Radio Access Network; Evolved Universal Terrestrial Radio Access Network (E-UTRAN); S1 Application Protocol (S1AP) (Release 18), Jun. 2024, Valbonne, France, 431 pages.

3GPP TS 36.331 V18.3.1, 3rd Generation Partnership Project, Technical Specification Group Radio Access Network; Evolved Universal Terrestrial Radio Access Network (E-UTRAN); Radio Resource Control (RRC); Protocol specification (Release 18), Sep. 2024, Valbonne, France, 1161 pages.

International Search Report and Written Opinion, PCT Patent Application No. PCT/SE2025/050167, mailed Sep. 9, 2025, 14 pages.

* cited by examiner

METHODS AND DEVICES FOR FACILITATING AN INTER-RAT HANDOVER

CROSS REFERENCE TO RELATED APPLICATIONS

This application is a continuation-in-part of PCT International Application No. PCT/SE 2025/050167 filed on Feb. 24, 2025, which in turn claims priority to U.S. Provisional Patent Application No. 63/721,807, filed on Nov. 18, 2024, the disclosures and content of each of which are incorporated by reference herein in their entirety.

TECHNICAL FIELD

The present disclosure relates to the field of telecommunications and in particular to techniques for facilitating inter-RAT handovers between EUTRA and NR telecommunications networks.

BACKGROUND

For operation in a radio network, such as Evolved Universal Mobile Telecommunications System Terrestrial Radio Access (EUTRA) or New Radio (NR) as specified by the $3^{rd}$ Generation Partnership Program (3GPP), user equipment (UE) radio access capabilities need to be known to the network nodes. By way of example, capabilities for operation in NR radio access technology (RAT) are sent in the radio resource control (RRC) UE-NR-Capability container, and capabilities for operation in EUTRA RAT are sent in the RRC UE-EUTRA-Capability container.

The UE radio access capabilities are initially sent from the UE to an evolved nodeB (eNB) or a next-generation nodeB (gNB) as part of a UE capability transfer procedure, where UE upon reception of a UECapabilityEnquiry message from eNB/gNB responds with the UECapabilityInformation message containing the requested capability container(s), see 3GPP TS 36.331 V18.0.0, clause 5.6.3 and 3GPP TS 38.331 V18.0.0, clause 5.6.1. The capability containers received in the radio access network (RAN) are subsequently uploaded and stored in the mobility management entity (MME) in evolved packet core (EPC) and in the access and mobility management function (AMF) in 5G core (5GC). When UE enters connected state while UE is still registered in MME or AMF, AMF and MME send the stored UE radio capabilities to gNB and eNB respectively. The UE capability containers are also forwarded from the source RAN node to the target RAN node at handover using the Source to Target Transparent Container defined in 3GPP TS 38.413 V18.3.0, clause 9.3.1.20 and 3GPP TS 36.413 V18.3.0, clause 9.2.1.56. The capability container of target RAT should be always provided in the Source to Target Transparent Container, but other capability containers are optional to send in the Source to Target Transparent Container.

Before inter-RAT handover from EUTRA to NR, eNB has obtained both the UE-EUTRA-Capability and UE-NR-Capability containers. Source eNB decides what UE capability containers to forward to target gNB, and includes these containers in Source to Target Transparent Container IE in an S1-AP Handover Required message, which is sent to MME, see 3GPP TS 36.413 V18.3.0, clause 9.1.5.1. MME includes E-UTRAN Transparent Container in a Forward Relocation Request message, which is sent over the N26 interface to AMF in the NR network, see TS 29.274 V18.7.0, clause 7.3.1. AMF includes the container originating from eNB in Source to Target Transparent Container in NG-AP Handover Request message, see 3GPP TS 38.413 V18.3.0, clause 9.2.3.4.

In inter-RAT handover from NR to EUTRA, gNB includes UE radio capability containers in Source to Target Transparent Container IE in an NG-AP Handover Required message, which is sent to AMF, see 3GPP TS 38.413 V18.3.0, clause 9.2.3.1. The impact on N26 is similar. MME includes the container originating from gNB in Source to Target Transparent Container in S1-AP Handover Request message, see 3GPP TS 36.413 V18.3.0, clause 9.1.5.4.

Due to feature growth (features are the various aspects to which the UE capabilities relate) and the need for the UE to signal a large number of band combination capabilities, the capability containers may be very large. Modern UEs supporting carrier aggregation with many component carriers (say, six component carriers) may produce very large capabilities; in particular, the UE-NR-Capability containers could exceed 64 KB in size. To support large messages, 3GPP release 16 introduced the possibility in both EUTRA and NR of performing RRC segmentation in case the size of the encoded RRC message PDU exceeds the maximum PDCP SDU size. This enables transfer of capability messages with a size of up to 16 RRC segments, each segment being up to maximum packet data convergence protocol service data unit (PDCP SDU) size. The maximum PDCP SDU size is 8188 bytes in EUTRA and 9000 bytes in NR. Hence, for EUTRA the maximum RRC message size is 16×8188 bytes=131 kB.

Not all networks support transfer of capability messages with the maximum theoretical size of 16 RRC segments. With respect to NR networks specifically, Tdoc R2-2408371 (Qualcomm, "Network signalling of maximum number of UL segments") has proposed that gNB should have the possibility to indicate to UE how many RRC segments that are supported by network.

Although there is now a well-functioning mechanism for handling large UE capability containers within an NR network or within an EUTRA network, it has been observed that handovers between NR and EUTRA networks have an increased likelihood of failing if they involve UEs associated with very large capability containers. A characteristic difficulty is the transfer of the Forward Relocation Request message, which carries the UE capability container to the target network.

SUMMARY

One objective of the present disclosure is to propose methods and devices which support a robust inter-RAT handover of a UE associated with very large capability containers. A particular objective is to propose methods and devices which support a robust handover from an EUTRA network to an NR network.

At least some of these objectives are achieved by the invention as defined by the independent claims. The dependent claims are directed to advantageous embodiments.

In particular, there is provided a capability transfer method implemented in a user equipment, a capability transfer method implemented in a base station in an EUTRA network, and an inter-RAT handover method implemented in a base station in an NR network. There are further provided a UE and network nodes with these abilities.

The present disclosure further relates to a computer program computer program containing instructions for causing a computer—or a UE, an access network node or a core network node in particular—to carry out the above method.

The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless this is explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

System Overview

Figure 1:
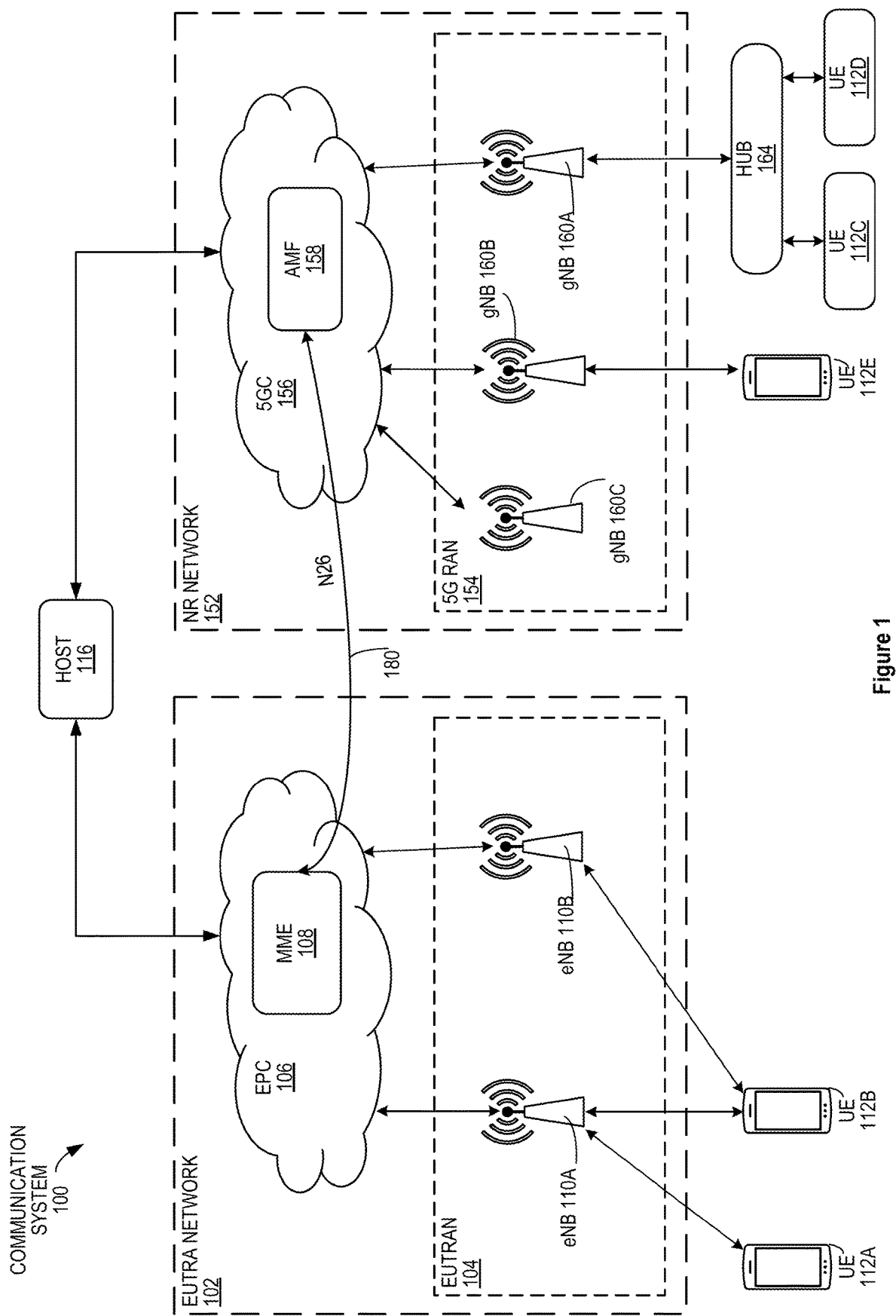
FIG. 1 shows two telecommunication networks supporting to two different radio access technologies, such as EUTRA and NR.

FIG. 1 shows an example of a communication system 100 in accordance with some embodiments.

In the example, the communication system 100 includes an EUTRA telecommunication network 102 and an NR telecommunication network 152. Each telecommunication network 102, 152 includes an access network 104, 154, such as a radio access network (RAN), and a core network 106, 156, which includes one or more core network nodes 108, 158. The access network 104, 154 includes one or more access network nodes, such as network nodes 110a, 110b, 160a, 160b, 160c (one or more of which may be generally referred to as network nodes 110, 160), or any other similar 3$^{rd}$ Generation Partnership Project (3GPP) access nodes or non-3GPP access points. Moreover, as will be appreciated by those of skill in the art, a network node is not necessarily limited to an implementation in which a radio portion and a baseband portion are supplied and integrated by a single vendor. Thus, it will be understood that network nodes include disaggregated implementations or portions thereof. For example, in some embodiments, the telecommunication network 102 includes one or more Open-RAN (ORAN) network nodes. An ORAN network node is a node in the telecommunication network 102 that supports an ORAN specification (e.g., a specification published by the O-RAN Alliance, or any similar organization) and may operate alone or together with other nodes to implement one or more functionalities of any node in the telecommunication network 102, 152, including one or more network nodes 110, 160 and/or core network nodes 108, 158.

An inter-RAT interface 180 is provided, which extends between the EUTRAN core network (Enhanced Packet Core, EPC) 106 and the NR core network (5G Core, 5GC) 156. The inter-RAT interface 180 may be implemented as an N26 interface. The N26 interface may apply the Tunnelling Protocol for Control plane (GTPv2-C), as specified in 3GPP TS 29.274, in particular under Release 17, 18 or later.

Although the below description makes explicit reference to the communication system 102 depicted in the left half of FIG. 1, it is appreciated that the description applies analogously to the communication system 152 in the right half as well.

Examples of an ORAN network node include an open radio unit (O-RU), an open distributed unit (O-DU), an open central unit (O-CU), including an O-CU control plane (O-CU-CP) or an O-CU user plane (O-CU-UP), a RAN intelligent controller (near-real time or non-real time) hosting software or software plug-ins, such as a near-real time control application (e.g., xApp) or a non-real time control application (e.g., rApp), or any combination thereof (the adjective "open" designating support of an ORAN specification). The network node may support a specification by, for example, supporting an interface defined by the ORAN specification, such as an A1, F1, W1, E1, E2, X2, Xn interface, an open fronthaul user plane interface, or an open fronthaul management plane interface. Moreover, an ORAN access node may be a logical node in a physical node. Furthermore, an ORAN network node may be implemented in a virtualization environment (described further below) in which one or more network functions are virtualized. For example, the virtualization environment may include an O-Cloud computing platform orchestrated by a Service Management and Orchestration Framework via an O-2 interface defined by the O-RAN Alliance or comparable technologies. The network nodes 110 facilitate direct or indirect connection of user equipment (UE), such as by connecting UEs 112a, 112b, 112c, and 112d (one or more of which may be generally referred to as UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

In the depicted example, the core network 106 connects the network nodes 110 to one or more hosts, such as host 116. These connections may be direct or indirect via one or more intermediary networks or devices. In other examples, network nodes may be directly coupled to hosts. The core network 106 includes one more core network nodes (e.g., core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobility Management Entity (MME), Home Subscriber Server (HSS), Access and Mobility Management Function (AMF), Session Management Function (SMF), Unified Data Management (UDM), Security Edge Protection Proxy (SEPP), Network Exposure Function (NEF), and/or a User Plane Function (UPF).

The host 116 may be under the ownership or control of a service provider other than an operator or provider of the access network 104 and/or the telecommunication network 102, and may be operated by the service provider or on behalf of the service provider. The host 116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 100 of FIG. 1 enables connectivity between the UEs, network nodes, and hosts. In that sense, the communication system may be configured to operate according to predefined rules or procedures, such as specific standards that include, but are not limited to: Universal Mobile Telecommunications System (UMTS); Long Term Evolution (LTE), and/or other suitable 4G or 5G standards, or any applicable future generation standard (e.g., 6G).

In some examples, the telecommunication network 102 is a cellular network that implements 3GPP standardized features. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UEs, while providing Enhanced Mobile Broadband (eMBB) services to other UEs, and/or Massive Machine Type Communication (mM TC)/Massive IoT services to yet further UEs.

In some examples, the UEs 112 are configured to transmit and/or receive information without direct human interaction. For instance, a UE may be designed to transmit information to the access network 104 on a predetermined schedule, when triggered by an internal or external event, or in response to requests from the access network 104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

An access network may allow a hub 164 to connect, as exemplified in FIG. 1 for the NR-RAN network 154. In the example, the hub 164 communicates with the access network 154 to facilitate indirect communication between one or more UEs (e.g., UE 112c and/or 112d) and network nodes (e.g., network node 110b). In some examples, the hub 164 may be a controller, router, content source and analytics, or any of the other communication devices described herein regarding UEs. For example, the hub 164 may be a broadband router enabling access to the core network 106 for the UEs. As another example, the hub 164 may be a controller that sends commands or instructions to one or more actuators in the UEs. Commands or instructions may be received from the UEs, network nodes 110, or by executable code, script, process, or other instructions in the hub 164. As another example, the hub 164 may be a data collector that acts as temporary storage for UE data and, in some embodiments, may perform analysis or other processing of the data. As another example, the hub 164 may be a content source. For example, for a UE that is a VR headset, display, loudspeaker or other media delivery device, the hub 164 may retrieve VR assets, video, audio, or other media or data related to sensory information via a network node, which the hub 164 then provides to the UE either directly, after performing local processing, and/or after adding additional local content. In still another example, the hub 164 acts as a proxy server or orchestrator for the UEs, in particular if one or more of the UEs are low energy IoT devices.

The hub 164 may have a constant/persistent or intermittent connection to the network node 110b. The hub 164 may also allow for a different communication scheme and/or schedule between the hub 164 and UEs (e.g., UE 112c and/or 112d), and between the hub 164 and the core network 106. In other examples, the hub 164 is connected to the core network 106 and/or one or more UEs via a wired connection. Moreover, the hub 164 may be configured to connect to an M 2M service provider over the access network 104 and/or to another UE over a direct connection. In some scenarios, UEs may establish a wireless connection with the network nodes 110 while still connected via the hub 164 via a wired or wireless connection. In some embodiments, the hub 164 may be a dedicated hub—that is, a hub whose primary function is to route communications to/from the UEs from/to the network node 110b. In other embodiments, the hub 164 may be a non-dedicated hub—that is, a device which is capable of operating to route communications between the UEs and network node 110b, but which is additionally capable of operating as a communication start and/or end point for certain data channels.

Figure 2:
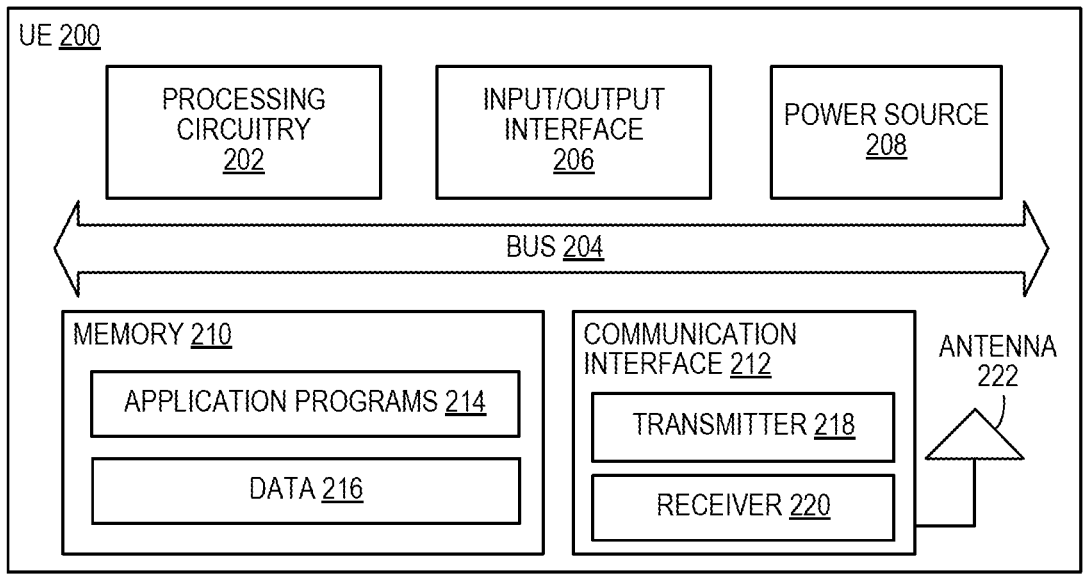
FIG. 2 is a block diagram of a user equipment.

FIG. 2 shows a UE 200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LM E), smart device, wireless customer-premise equipment (CPE), vehicle, vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 200 includes processing circuitry 202 that is operatively coupled via a bus 204 to an input/output interface 206, a power source 208, a memory 210, a communication interface 212, and/or any other component, or any combination thereof. Certain UEs may utilize all or a subset of the components shown in FIG. 2. The level of integration between the components may vary from one UE to another UE. Further, certain UEs may contain multiple instances of a component, such as multiple processors, memories, transceivers, transmitters, receivers, etc.

The processing circuitry 202 is configured to process instructions and data and may be configured to implement any sequential state machine operative to execute instructions stored as machine-readable computer programs in the memory 210. The processing circuitry 202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 202 may include multiple central processing units (CPUs).

In the example, the input/output interface 206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 208 is structured as a battery or battery pack. Other types of power sources, such as an external power source (e.g., an electricity outlet), photovoltaic device, or power cell, may be used. The power source 208 may further include power circuitry for delivering power from the power source 208 itself, and/or an external power source, to the various parts of the UE 200 via input circuitry or an interface such as an electrical power cable. Delivering power may be, for example, for charging of the power source 208. Power circuitry may perform any formatting, converting, or other modification to the power from the power source 208 to make the power suitable for the respective components of the UE 200 to which power is supplied.

The memory 210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 210 includes one or more application programs 214, such as an operating system, web browser application, a widget, gadget engine, or other application, and corresponding data 216. The memory 210 may store, for use by the UE 200, any of a variety of various operating systems or combinations of operating systems.

The memory 210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIM s), such as a USIM and/or ISIM, other memory, or any combination thereof. The UICC may for example be an embedded UICC (eUICC), integrated UICC (iUICC) or a removable UICC commonly known as 'SIM card.' The memory 210 may allow the UE 200 to access instructions, application programs and the like, stored on transitory or non-transitory memory media, to off-load data, or to upload data. An article of manufacture, such as one utilizing a communication system may be tangibly embodied as or in the memory 210, which may be or comprise a device-readable storage medium.

The processing circuitry 202 may be configured to communicate with an access network or other network using the communication interface 212. The communication interface 212 may comprise one or more communication subsystems and may include or be communicatively coupled to an antenna 222. The communication interface 212 may include one or more transceivers used to communicate, such as by communicating with one or more remote transceivers of another device capable of wireless communication (e.g., another UE or a network node in an access network). Each transceiver may include a transmitter 218 and/or a receiver 220 appropriate to provide network communications (e.g., optical, electrical, frequency allocations, and so forth). Moreover, the transmitter 218 and receiver 220 may be coupled to one or more antennas (e.g., antenna 222) and may share circuit components, software or firmware, or alternatively be implemented separately.

In the illustrated embodiment, communication functions of the communication interface 212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), A synchronous Transfer Mode (ATM), QUIC, Hypertext Transfer Protocol (HTTP), and so forth.

Regardless of the type of sensor, a UE may provide an output of data captured by its sensors, through its communication interface 212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 200 shown in FIG. 2.

Figure 3:
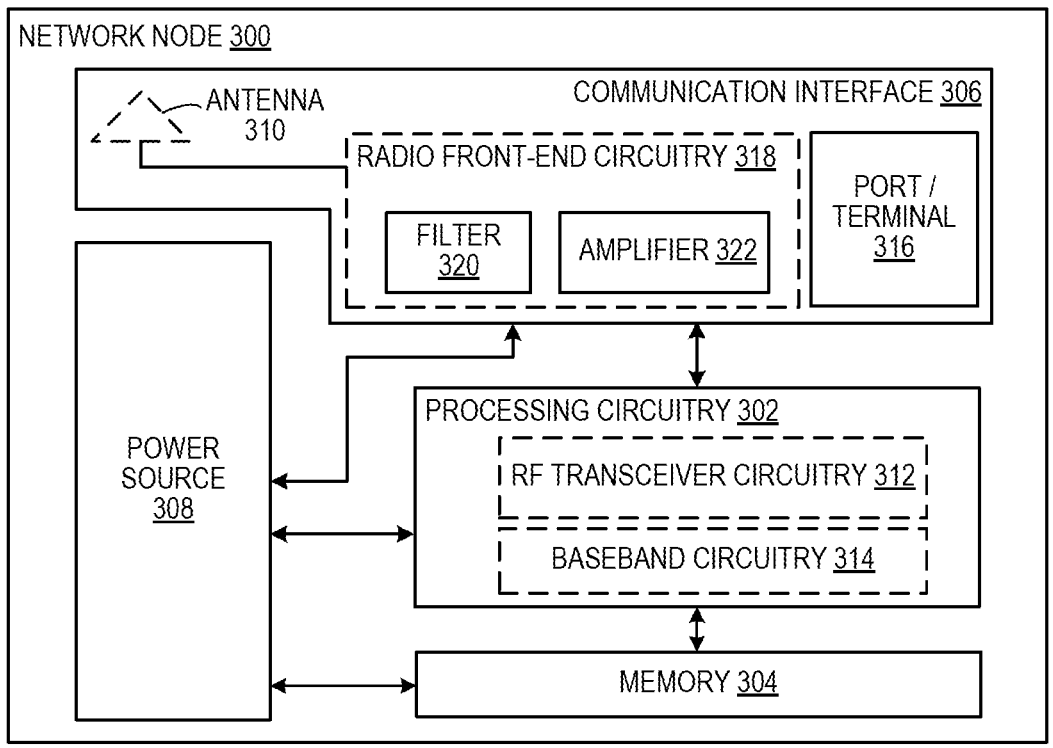
FIG. 3 is a block diagram of a network node acting as an access network node or a core network node.

FIG. 3 shows a network node 300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, NodeBs, evolved NodeBs (eNBs) and NR NodeBs (gNBs)), O-RAN nodes or components of an O-RAN node (e.g., O-RU, O-DU, O-CU).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units, distributed units (e.g., in an O-RAN access node) and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SM LCs)), and/or Minimization of Drive Tests (M DTs).

The network node 300 includes a processing circuitry 302, a memory 304, a communication interface 306, and a power source 308. The network node 300 may be composed of multiple physically separate components (e.g., a NodeB component and a RNC component, or a BTS component and a BSC component, etc.), which may each have their own respective components. In certain scenarios in which the network node 300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 300 may be configured to support multiple radio access technologies (RATs). In such embodiments, some components may be duplicated (e.g., separate memory 304 for different RATs) and some components may be reused (e.g., a same antenna 310 may be shared by different RATs). The network node 300 may also include multiple sets of the various illustrated components for different wireless technologies integrated into network node 300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 300.

The processing circuitry 302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 300 components, such as the memory 304, to provide network node 300 functionality.

In some embodiments, the processing circuitry 302 includes a system on a chip (SOC). In some embodiments, the processing circuitry 302 includes one or more of radio frequency (RF) transceiver circuitry 312 and baseband processing circuitry 314. In some embodiments, the radio frequency (RF) transceiver circuitry 312 and the baseband processing circuitry 314 may be on separate chips (or sets of chips), boards, or units, such as radio units and digital units. In alternative embodiments, part or all of RF transceiver circuitry 312 and baseband processing circuitry 314 may be on the same chip or set of chips, boards, or units.

The memory 304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 302. The memory 304 may store any suitable instructions, data, or information, including a computer program, software, an application including one or more of logic, rules, code, tables, and/or other instructions capable of being executed by the processing circuitry 302 and utilized by the network node 300. The memory 304 may be used to store any calculations made by the processing circuitry 302 and/or any data received via the communication interface 306. In some embodiments, the processing circuitry 302 and memory 304 is integrated.

The communication interface 306 is used in wired or wireless communication of signaling and/or data between a network node, access network, and/or UE. As illustrated, the communication interface 306 comprises port(s)/terminal(s) 316 to send and receive data, for example to and from a network over a wired connection. The communication interface 306 also includes radio front-end circuitry 318 that may be coupled to, or in certain embodiments a part of, the antenna 310. Radio front-end circuitry 318 comprises filters 320 and amplifiers 322. The radio front-end circuitry 318 may be connected to an antenna 310 and processing circuitry 302. The radio front-end circuitry may be configured to condition signals communicated between antenna 310 and processing circuitry 302. The radio front-end circuitry 318 may receive digital data that is to be sent out to other network nodes or UEs via a wireless connection. The radio front-end circuitry 318 may convert the digital data into a radio signal having the appropriate channel and bandwidth parameters using a combination of filters 320 and/or amplifiers 322. The radio signal may then be transmitted via the antenna 310. Similarly, when receiving data, the antenna 310 may collect radio signals which are then converted into digital data by the radio front-end circuitry 318. The digital data may be passed to the processing circuitry 302. In other embodiments, the communication interface may comprise different components and/or different combinations of components.

In certain alternative embodiments, the network node 300 does not include separate radio front-end circuitry 318, instead, the processing circuitry 302 includes radio front-end circuitry and is connected to the antenna 310. Similarly, in some embodiments, all or some of the RF transceiver circuitry 312 is part of the communication interface 306. In still other embodiments, the communication interface 306 includes one or more ports or terminals 316, the radio front-end circuitry 318, and the RF transceiver circuitry 312, as part of a radio unit (not shown), and the communication interface 306 communicates with the baseband processing circuitry 314, which is part of a digital unit (not shown).

The antenna 310 may include one or more antennas, or antenna arrays, configured to send and/or receive wireless signals. The antenna 310 may be coupled to the radio front-end circuitry 318 and may be any type of antenna capable of transmitting and receiving data and/or signals wirelessly. In certain embodiments, the antenna 310 is separate from the network node 300 and connectable to the network node 300 through an interface or port.

The antenna 310, communication interface 306, and/or the processing circuitry 302 may be configured to perform any receiving operations and/or certain obtaining operations described herein as being performed by the network node. Any information, data and/or signals may be received from a UE, another network node and/or any other network equipment. Similarly, the antenna 310, the communication interface 306, and/or the processing circuitry 302 may be configured to perform any transmitting operations described herein as being performed by the network node. Any information, data and/or signals may be transmitted to a UE, another network node and/or any other network equipment.

The power source 308 provides power to the various components of network node 300 in a form suitable for the respective components (e.g., at a voltage and current level needed for each respective component). The power source 308 may further comprise, or be coupled to, power management circuitry to supply the components of the network node 300 with power for performing the functionality described herein. For example, the network node 300 may be connectable to an external power source (e.g., the power grid, an electricity outlet) via an input circuitry or interface such as an electrical cable, whereby the external power source supplies power to power circuitry of the power source 308. As a further example, the power source 308 may comprise a source of power in the form of a battery or battery pack which is connected to, or integrated in, power circuitry. The battery may provide backup power should the external power source fail.

Embodiments of the network node 300 may include additional components beyond those shown in FIG. 3 for providing certain aspects of the network node's functionality, including any of the functionality described herein and/or any functionality necessary to support the subject matter described herein. For example, the network node 300 may include user interface equipment to allow input of information into the network node 300 and to allow output of information from the network node 300. This may allow a user to perform diagnostic, maintenance, repair, and other administrative functions for the network node 300. In some embodiments of the network node 300, the network node is a core network node. In embodiments where the network node is a core network node, the network node 300 generally does not comprise an antenna 310, baseband circuitry 314, radio frequency transceiver circuitry 312, nor radio front-end circuitry 318.

Facilitating Inter-RAT Handover from EUTRA to NR

The disclosure proposes that when an evolved nodeB (eNB) in an Evolved Universal Mobile Telecommunications System Terrestrial Radio Access (EUTRA) telecommunications system initiates capability enquiry with a next generation nodeB (gNB) in a New Radio (NR) telecommunications system, a user equipment (UE) ensures that the UE-NR-Capability container included in the UECapabilityInformation message is limited to a size smaller than the N26 message size limitation, i.e. significantly smaller than what the EUTRA radio resource control (RRC) specification allows. At inter-RAT handover from eNB to gNB the UE-NR-Capability can then be successfully forwarded over the N26 interface. Further details about the presented solution and reasons why this solution adequately addresses the shortcomings of the prior art and is compatible with the technical context will now be presented. The N26 interface is an inter-core-network interface between MME in EPC and AMF in 5GC. N26 supports inter-system (or inter-RAT) handover procedures. The N26 interface is based on the GPRS Tunnelling Protocol version 2 (GTPv2) and the UDP transport protocol. Since there is no segmentation function in the N26 protocol, the maximum UDP datagram size limitation of 65535 bytes inherent in UDP will limit the messages on N26 interface to at most approximately 64 KB (~64 kB). In particular, the Forward Relocation Request message containing UE-NR-Capability and/or UE-EUTRA-Capability containers will be limited to ~64 KB. Capability containers and messages cannot just be truncated to a smaller size since that breaks the ASN1 encoding syntactically. Hence, a too large message will be dropped on its way to the target.

It is recalled that a UDP datagram contains a 16-bit length field, which indicates the length in octets of the datagram, including the 8 octets of header. Hence, the UDP datagram is limited to a maximum size of $2^{16}-1=65535$ bytes (octets). One may write 65536 byte=64 KiB, and 64000 byte=64 KB. See RFC 768 (J. Postel (ed.), *User Datagram Protocol*, IETF).

3GPP mandates only one UE radio capability container to be forwarded in each direction, namely the one for the network of the target RAT. In EUTRA to NR handover UE-NR-Capability is mandated, and in NR to EUTRA handover UE-EUTRA-Capability is mandated.

The Uu (air) interfaces between the UE and the eNB and between the UE and the gNB as well as the S1 interface between the eNB and the EPC and the NG interface between gNB and 5GC all support RRC messages of up to 16 RRC segments (131 kB and 144 KB for EUTRA and NR respectively). However, for the purpose of an inter-RAT handover, the N26 interface between MME and AMF is limited to a maximum message size of ~64 KB. This means that a UE-NR-Capability container larger than ~64 KB cannot be transferred from the mobility management entity (MME) to the access and mobility management function (AMF) as part of the Forward Relocation Request message at inter-RAT handover from EUTRA to NR, which would lead to gNB rejecting the handover to NR and thereby inter-RAT handover failure or the MME rejecting Handover Required message by sending a Handover Preparation Failure message to source RAN or AMF rejecting the Forward Relocation Request received from MME which will result in MME rejecting Handover Required message. The same problem applies in principle also for the reverse situation of inter-RAT handover from NR to EUTRA, although the problem is much less severe as it is not expected that the UE-EUTRA-Capability container will be so large that the ~64 KB limitation is a limitation in practice. Without loss of generality, the following description will focus on inter-RAT handover from EUTRA to NR. The teachings to be disclosed are equally applicable to inter-RAT handover from NR to EUTRA.

UEs need to ensure that the UECapabilityInformation message can be accommodated within a maximum of 16 RRC segments. In a situation where the message would become too large if the UE included all the relevant capabilities, the UE will need to reduce the size of the message (s). How the UE achieves this is left to implementers. One way of reducing the message size is by omitting some of the announced band combinations, but the UE may also save message size by not indicating support for certain frequency bands and optional features that UE—if it was not restricted by message size—would have indicated itself capable of.

Hence the maximum size limitations over the Uu interface and the N26 interface are not aligned. Workarounds are required to enable inter-RAT handover from EUTRA to NR for very capability UEs for which the UE-NR-Capability containers may be larger than the ~64 KB limitation.

Further, standardizing a new transport protocol for N26 or introducing standardized message segmentation on this interface would be quite complex to drive in standardization since N26 is a multi-vendor interface. A gain because multiple vendors are involved, there would be complexities associated with establishing that the same protocol version is used by both parties. Hence, it is valuable to find a solution that circumvents the N26 limitation without necessarily changing the existing implementations of N26.

When the eNB initiates capability enquiry with the EUTRA RAT, the UE shall ensure that the UE-NR-Capability container included in the UECapabilityInformation message is limited to a size smaller than the N26 message size limitation, i.e. significantly smaller than what the EUTRA RRC specification allows. At inter-RAT handover from the eNB to the gNB the UE-NR-Capability can then be successfully forwarded over the N26 interface. The target gNB determines whether the forwarded UE-NR-Capability is likely to have been reduced in size, and if that is the case gNB will perform a capability enquiry in NR RAT to ensure that the UE's full NR capabilities become known to the gNB.

The invention will now be described in more detail, with reference to the sequence diagram in FIGS. 4A and 4B. Here, one or more methods according to embodiments of the invention will be identified, each method being implemented in a UE, an eNB, a gNB, or in a core network node of the respective core networks EPC and 5GC.

Figure 4A:
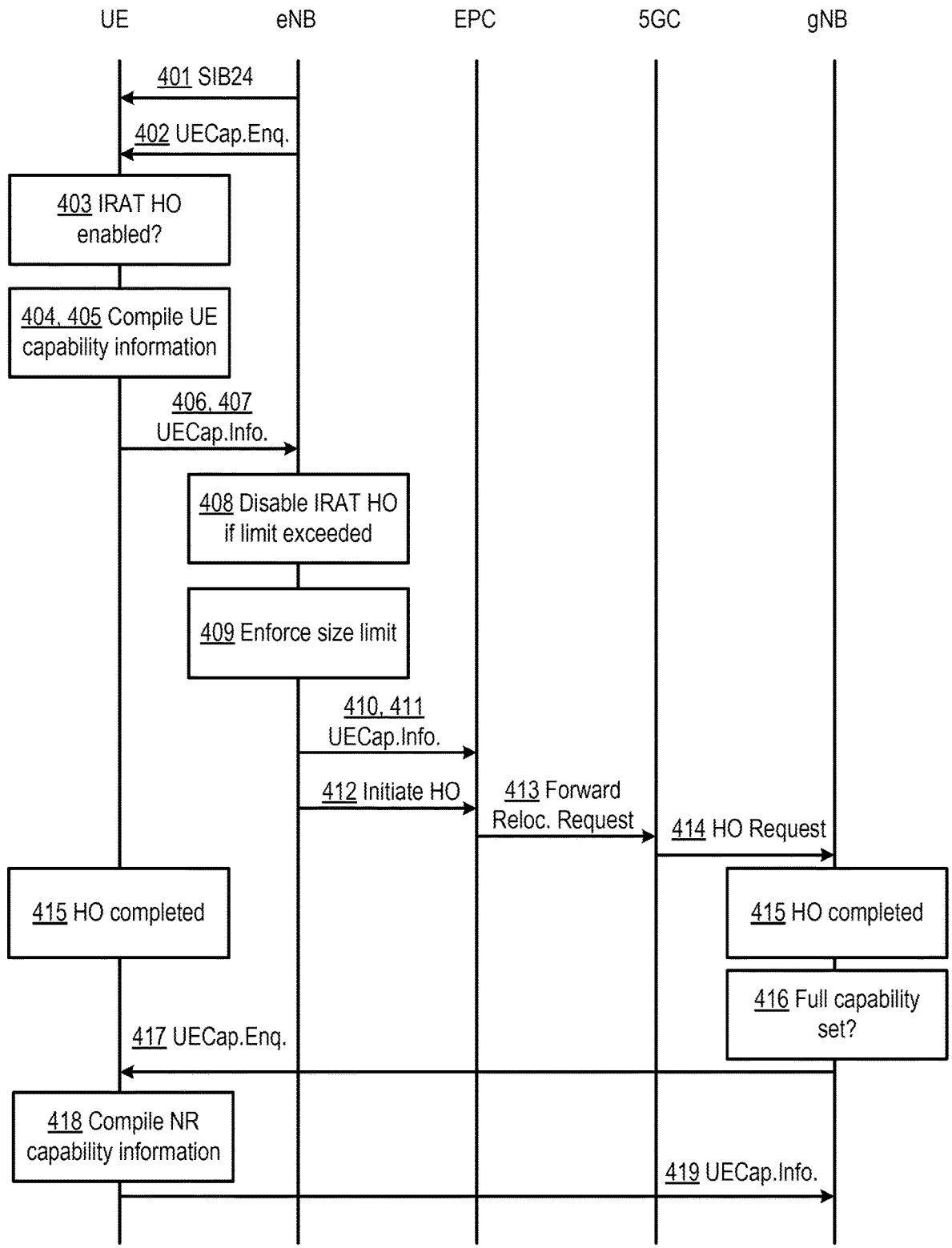
FIGS. 4A and 4B are a sequence diagram and a detail thereof, illustrating an inter-RAT handover procedure between the two telecommunication networks, as well as operations supporting the inter-RAT handover procedure.

The methods of the sequence diagram in FIG. 4A relate to capability transfer in a UE which is operable in EUTRA networks and in NR networks. The base stations, indicated as "eNB" and "gNB" in FIG. 4A, may be selected from eNBs, gNBs, or base stations according to any future standard. Without loss of generality and for the purpose of clarity in the description of FIG. 4A, the UE will be assumed to be attached to an eNB base station and the capability transfer will be assumed to comprise transferring capabilities of the UE to a gNB via the eNB and EPC and 5GC in preparation for a handover to the gNB.

The capability transfer method comprises, for the UE, compiling 404 EUTRA capabilities of the UE. The capability transfer method comprises, for the UE, compiling 405 NR capabilities of the UE. In some embodiments, the compiling EUTRA capabilities 404 and/or the compiling NR capabilities 405 may be performed by the UE before receiving any request for a capability information message. Said compiling may include setting the contents of a UE capability information message 406, 407, such as by identifying which capabilities are to be transferred to the eNB 110. The compiling may further include expressing said capabilities in a suitable format (e.g., ue-CapabilityRAT-Container) or syntax (e.g., ASN1).

The capability transfer method further comprises transmitting one or more UE capability information messages 406, 407 with the compiled EUTRA capabilities and NR capabilities to a base station 110 in an EUTRA network. The base station in the EUTRA network is an eNB which the UE is currently attached to. The one or more UE capability information messages 406, 407 may comprise a first UE capability information message comprising the compiled EUTRA capabilities and a second UE capability information message comprising the compiled NR capabilities. Alternatively, the one or more UE capability information messages may comprise a single UE capability information message containing all the compiled capabilities for both EUTRA and NR. Alternatively, the one or more UE capability information messages may comprise a first UE capability information message comprising the compiled EUTRA capabilities, a second UE capability information message comprising the compiled NR capabilities, and a third UE capability information message containing the EUTRA-NR capabilities (ENDC). The one or more UE capability information messages 406, 407 may alternatively comprise a segmented message, wherein all parts of the segmented message together correspond to the compiled capabilities. In a network supporting RRC segmentation, a UE capability information message may be sent in up to 16 parts if the encoded RRC message PDU exceeds the maximum PDCP SDU size (8188 bytes in EUTRA, 9000 bytes in NR). The RRC segmentation can be applied to all, some or none of the UE capability information messages 406, 407, depending on their size. For the purposes of the present disclosure, the totality of these up to 16 parts will be referred to as a "UE capability information message". Further, each message may be a UECapabilityInformation message as specified in 3GPP TS 36.331.

The method performed by the UE is characterized in that the NR capabilities are compiled 405 subject to a capability size limit, which corresponds to a supported size of a container in a handover message 413 sent on an inter-RAT interface 100 from EPC to 5GC. More precisely, the capability size limit may be equal to said supported size minus space occupied by any message headers and further protocol elements. In some embodiments, the capability size limit shall not apply to the EUTRA capabilities. Hence only the NR capabilities are compiled subject to the capability size limit in such embodiments.

In some embodiments, the capability size limit may be at most 65535 bytes, in particular 65535 bytes minus space occupied by headers and other protocol elements. Alternatively, the capability size limit may be 5 or 6, or at most 5 or at most 6, times the size of one RRC block. Two further alternatives are to use a capability size of 7 times (7×8188=57316 byte in EUTRA) or 8 times (8×8188=65504 byte in EUTRA) the size of one RRC block, which are still less or just less than 65535 bytes, or at most 6 or at most 7 times the size of one RRC block. In embodiments where the capability size limit corresponds to the supported size of a container in a handover message 413, the handover message 413 may be a Forward Request Relocation message. In embodiments where the handover message 413 is a Forward Request Relocation message, the container is an NR Transparent Container.

An optional step comprises the UE assessing 403 whether inter-RAT handover is enabled, wherein the capability size limit shall apply only if inter-RAT handover is enabled. In particular, step 403 may include assessing whether inter-RAT handover between EUTRA and NR is enabled, and in this case the capability size limit shall apply.

The method may further comprise, in an optional step, the UE receiving a SIB 24 block 401 from the base station. The SIB 24 block may thus be assumed to be received from an eNB. In embodiments where the UE receives a SIB 24 block 401, assessing 403 whether the inter-RAT handover is enabled includes determining that inter-RAT handover is enabled in reaction to receiving the SIB 24 block. In a per se known manner, the UE 112 carries out a basic cell-search procedure, synchronizes to the cell served by the eNB 110, acquires the physical-layer identity of the cell, and detects the cell frame timing. Once this has been achieved, the device acquires the cell system information, which is repeatedly broadcast by the network. The system information includes, among other things, information about the uplink and downlink bandwidths, TDD configuration, detailed parameters related to random-access transmission and so on. In EUTRAN, the system information is delivered on the one hand, as a master information block (MIB) on the BCH and, on the other hand, as different system information blocks (SIBs) on the DLSCH. The SIBs may optionally include a SIB 24 block, denoted 401 in FIG. 4A. SIB 24 contains information relevant for inter-RAT cell re-selection, i.e. information about NR frequencies and NR neighboring cells relevant for cell re-selection (see also definition of SIB 24 in 3GPP TS 36.331 and TS 38.331). If the UE 112 does not receive any SIB 24, it may conclude that inter-RAT handover from the EUTRA network 102 to an NR network 152 will not occur. This corresponds to step 403 in FIG. 4A. As a consequence, the UE 112 does not need to ensure that the size of the NR capabilities is such that it can be transmitted over the N26 interface 180 at inter-RAT handover.

The UE may additionally receive a UE capability enquiry message 402, such as UECapabilityEnquiry specified in 3GPP TS 36.331, containing configuration data related to NR operation. The configuration data may for example include a list of bands and band combinations which are in use or are relevant for operation for other reasons. The configuration data relating to EUTRA may correspond to settings of the eNB 110 sending the UE capability enquiry message 402. In some embodiments, the configuration data specifies that NR-only band combinations are to be excluded from the capability message. Hence only EUTRA-NR band combinations (for EUTRA-NR dual connectivity, ENDC) are included in the one or more UE capability information messages 406, 407. In such embodiments, assessing 403 whether inter-RAT handover is enabled comprises determining that inter-RAT handover is not enabled in reaction to NR-only band combinations being excluded.

Further, the UE capability enquiry message 402 may include an eutra-nr-only indication, which implies that IRAT HO will not occur. This is an alternative basis for the UE 112 to conclude, in step 403, that IRAT HO is not enabled.

Figure 4B:
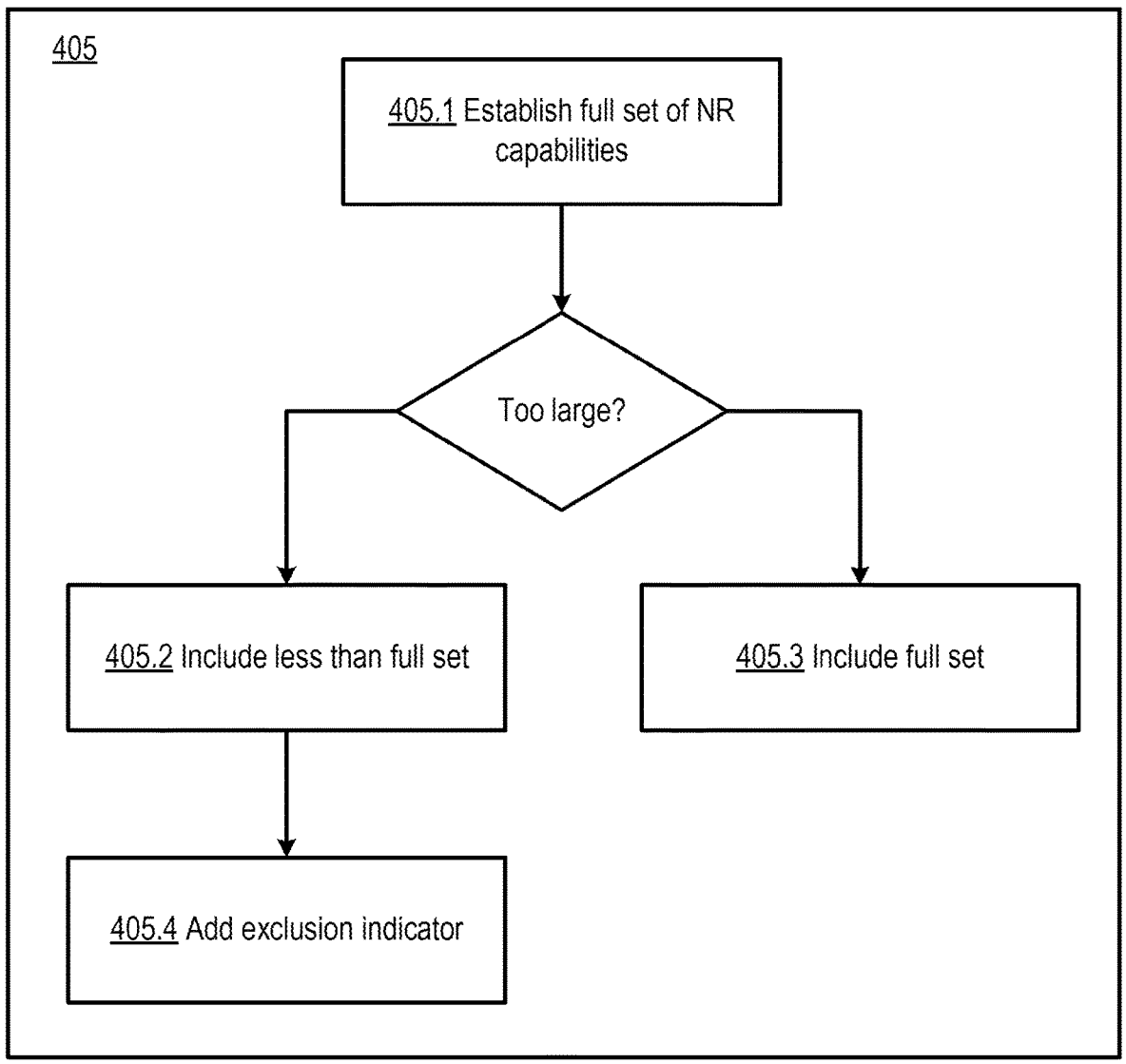

With reference to FIG. 4B, alternative embodiments related to step 405 will now be described in more detail. In some embodiments, compiling 405 the NR capabilities comprises establishing 405.1 a full set of NR capabilities of the UE. Establishing 405.1 a full set of UE capabilities comprises identifying the full set of NR capabilities of the UE. The full set of NR capabilities may correspond to the maximum capabilities of the UE 112 as such. Typically, the UE capability enquiry message 402 contains configuration data relating to NR operation which is limited in some respects (e.g., as to frequency bands or band combinations), wherein the full set of NR capabilities corresponds to the maximum capabilities of the UE 112 which is compatible with the configuration data relating to NR operation according to the UE capability enquiry message 402. In other words, the full set of NR capabilities is obtained after conceptually 'filtering' the UE's 112 capabilities with respect to the NR network's 152 capabilities. In some embodiments, the eNB includes a full list of frequency bands which the eNB deems relevant for operation on the NR side in the UE capability enquiry message. The eNB may derive said full list of frequency bands from configuration information available to the eNB, such as information regarding relations to neighboring NR cells. In some embodiments, the eNB thus provides the UE with sufficient information to determine a full set of NR capabilities of the UE. In other embodiments, the information comprised in the UE capability enquiry message comprises a subset of the full set of capabilities of the UE derived from a (deliberately) incomplete list of frequency band information available to the UE.

Establishing 405.1 the full set of NR capabilities of the UE may in some embodiments comprise creating a data record in an internal memory of the UE 112, in which data record the NR capabilities are indicated explicitly. In other embodiments, the UE 112 establishes 405.1 the full set of NR capabilities of the UE by passively identifying them. This to say, the establishing step 405.1 does not necessarily include any internal or external action by the UE 112, but it may be sufficient for the UE 112 to hold software corresponding to a 3GPP specification which indicates the maximum capabilities of the UE as such. Optionally, the UE 112 may further acquire the configuration data received in the UE capability enquiry message 402, which is information sufficient for filtering the UE's 112 capabilities with respect to the NR network's 152 capabilities.

If the full set of NR capabilities exceeds the capability size limit, the method comprises a step of including 405.2 less than the full set of NR capabilities in the compiled list of NR capabilities. The full set of NR capabilities exceeds the capability size limit if it cannot be transferred in the container in the handover message 413 sent on the inter-RAT interface 180, i.e., if the full set of NR capabilities together with message headers and any further protocol elements is larger than the supported size of the container. In this sense, the capability size limit corresponds to the supported size of the container. The amount of NR capabilities to include is determined such that the capability size limit is met. In embodiments where the UE cannot establish a full set of NR capabilities and the compiled incomplete set of NR capabilities exceeds the capability size limit, the method comprises including less that the compiled incomplete set of NR capabilities in the compiled list of NR capabilities. The amount of NR capabilities to include is determined such that the capability size limit is met.

There are various example ways in which the UE 112 can include 405.2 less than the full set of NR capabilities in the compiled list of NR capabilities, including various exclusion and inclusion rules.

Example 1: The UE 112 has access to an ordered list of band combinations (BCs), and the UE includes gradually more capabilities corresponding to these BCs in the order according to the ordered list, until the capability size limit is attained. The excess capabilities corresponding to the next and further BCs in this ordered list are omitted (not included). If additionally the ordered list is pre-agreed between the UE 112 and at least some base stations 160 in the NR network 152, those base stations 160 can refer to the pre-agreed ordered list in order to determine, in subsequent step 416, whether the UE 112 has stopped including capabilities before the end of the list (i.e., prematurely) and hence, whether the NR capabilities are less than the full set of NR capabilities of the UE 112. This may be visible in that the ordered list of BCs is incomplete, in particular interrupted before its nominal end. Equivalently, the base station 160 may perform a completeness check relative to the pre-agreed list, optionally after sorting the NR capabilities are sorted in the order of the pre-agreed list. The ordered list of BCs may be pre-agreed in the sense that it appears in a 3GPP specification, which the base stations 160 and UE 112 implement at least partly, such as one or more of the 3GPP TS 38.101 specifications.

The below example rules of the exclusion type may be carried out as follows: The UE initially establishes 405.1 the full set of UE capabilities by explicitly identifying the full set of NR capabilities of the UE, e.g., as a data record in an internal memory. If the size of the data record exceeds the capability size limit, the UE 112 excludes the capabilities indicated by the rule until the size of the data record falls below the capability size limit.

The rules of the inclusion type may be carried out as follows: The UE 112 includes the capabilities indicated by the rule in data record in an internal memory. If the size of the data record is still below the capability size limit, the UE 112 includes gradually more capabilities (e.g., at random, or according to an ordered list, or according to a further inclusion-type rule) until the capability size limit is attained.

Example 2: U plink transmit (UL TX) switching BCs are excluded. UL TX switching may relate to inter-band NR Carrier Aggregation (NR-CA), supplementary uplink (SUL), or EUTRA-NR Dual Connectivity (EN-DC), as described in 3GPP TS 38.306 Release 16 or higher.

Example 3: NR Dual Connectivity (NR-DC) BCs with more than a predefined number X of FR1 carriers, where for example X=1 or X=2, are excluded.

Example 4: Only band combinations relevant in the region of the public land mobile network (PLMN) are included.

Example 5: Only capabilities supporting one of the sub-carrier spacings permitted by 3GPP specifications for each band are included. In particular, capabilities of alternative subcarrier spacing values other than current ecosystem defaults (e.g., 15 kHz for FR1 FDD, 30 KHz for FR1 TDD and 120 kHz for FR2 bands) is excluded.

Example 6: Higher-order CA BCs are excluded, e.g., BCs which include 5 component carriers (CCs) or more.

Example 7: Lower-order CA combinations are excluded, e.g., BCs with 1-4 CCs. Instead, the UE 112 may rely on implicit fallbacks to the reported superset BCs. This is potentially applicable to the uplink too, that is, the UE 112 may rely on uplink CA BCs instead of signaling single-CC UL BCs. Such single-CC UL BCs may be expected to be advantageous in that, say, their power class is better.

Example 8: Basic support of single-CC BCs is reported for every band, but a subset of those bands is excluded from CA BCs.

Example 9: FR1 bandwidth class B is excluded, and the UE 112 rely only on bandwidth class C to indicate support for 2-CC contiguous CA in a band.

Example 10: Intra-band frequency-division duplex (FDD) CA BCs are excluded.

Example 11: Contiguous CA is prioritized over non-contiguous CA (or vice versa). This is to say, the UE 112 includes the capabilities corresponding to contiguous CA, and only if the capability size limit has not yet been reached, the UE 112 goes on to include (at least some of) the capabilities corresponding to non-contiguous CA.

Example 12: Some permutations of contiguous/non-contiguous CA for FR2 are excluded. Hence, the UE 112 does not include all possible permutations of contiguous/non-contiguous CA for FR2.

Example 13: BCs specific to UL single-user multiple-input multiple-output (SU-MIMO) are excluded (to the extent such BCs exist).

Example 14: BCs or feature sets that are adapted for reporting higher capabilities for cases when UE is configured with fewer MIMO layers are excluded (to the extent such BCs or FSEs exist).

Example 15: BCs are excluded randomly. For instance, in the established full set of UE capabilities, random sampling is used to select capabilities to be excluded from that set, and the exclusion process goes on until the total size falls below the capability size limit.

Example 16: Bands in supportedBandListNR that are not requested in the UE capability enquiry message 402 are excluded. In situations where the UE is able to successfully verify that the full set of NR capabilities is within the capability size limit, the UE includes 405.3 the full set of capabilities in the compiled NR capabilities.

Returning to FIG. 4A, the method for the UE may further comprise, after inter-RAT handover is completed and the UE is attached to the gNB in the target network, compiling 418 a full set of NR capabilities of the UE and transmitting an additional UE capability information message 419 with the compiled full set of NR capabilities to the gNB. After the inter-RAT handover has been completed, the capability size limit no longer applies to the compiling of the full set of NR capabilities. The capability size limit originates from the size limit on the EPC-to-5GC messages and hence no longer applies after the handover is complete, so that the UE can communicate a full list of the capabilities without capability size limit constraints after the handover.

It is noted that the UE 112 will behave in the same manner when requested to transfer EUTRA capabilities while being attached to the EUTRA network 102, i.e., it compiles the EUTRA capabilities without considering the capability size limit. The same behavior also applies if the UE 112 connects initially to the NR network 152: it will compile the NR capabilities without considering the capability size limit and report them to the gNB 160. In other words, a UE 112 which connects initially to the NR network 152 does not consider the capability size limit when it compiles the NR capabilities and reports them to the gNB 160, but it applies the capability size limit to the EUTRA capabilities.

In some embodiments, the method for the UE comprises receiving a UE capability enquiry message 402 containing configuration data relating to NR operation. The full set of NR capabilities provided in the additional UE capability message 419 may be dependent on the received UE capability enquiry message 402. The UE capability enquiry message 402 is received from the gNB and may contain information absent from the UE capability enquiry message 402 received from the eNB before the inter-RAT handover was performed.

Some of the actions illustrated in FIG. 4A form a capability transfer method implemented in the base station in the EUTRA network, the eNB 110. More precisely, the base station in the EUTRA network is operable to initiate the inter-RAT handover to the NR network. The capability transfer method for the base station in the EUTRA network comprises receiving from the UE one or more UE capability information messages 406, 407 containing EUTRA and NR capabilities.

The capability transfer method in the eNB comprises the base station in the EUTRA network assessing whether the NR capabilities exceed the capability size limit, where the capability size limit corresponds to a supported size of a container in the handover message 413 sent on the inter-RAT interface from EPC to NR. The base station further disables 408 the inter-RAT handover in reaction to determining that the NR capabilities exceed the capability size limit.

In some embodiments, the capability size limit may be 65535 bytes. Alternatively, the capability size limit is 5 or 6, or at most 5 or at most 6, times the size of one RRC segment. Further alternatively, the capability size limit may be 6 or 7, or at most 6 or at most 7, times the size of one RRC block. In some embodiments, the capability size limit corresponds to a supported size of a container in a handover message 413 sent on an inter-RAT interface (e.g., N26) 180 between Evolved Packet Core 106 and 5G Core 156. In embodiments where the handover message 413 is a Forward Request Relocation message, the container is an NR Transparent Container; the capability size limit is thus determined by the supported size of this container specified by the applicable version of a relevant 3GPP specification.

A further related method is an inter-RAT handover method implemented in a base station 160 in the NR network 152. The base station performing the method is the target gNB.

The method performed by the target gNB comprises completing a handover 415 of the UE, wherein the UE is handed over to base station 160 from the EUTRA network 102. The procedures by which the handover is carried out may include an exchange of signaling between the UE 112 and the base station 160 (e.g., synchronization, acquisition of system information, connection to cell or the like). When the handover has been completed, the target gNB receives, from a core network node in the NR network, a message 414 containing the NR capabilities of the UE. Based on the received handover message and the received NR capabilities, the target gNB will perform the handover, including configuring the UE based on the received NR capabilities.

The method performed by the target gNB further comprises assessing 416 whether the received NR capabilities are less than the full set of NR capabilities of the UE. Assessing 416 may happen before, during or after performing the handover.

After performing the handover and assessing 416 the received NR capabilities of the UE, if the received NR capabilities of the UE are less than the full set of NR capabilities, the target gNB (where the UE is now attached) transmits a UE capability enquiry message 417 to the UE. Since the inter-RAT handover has been completed and the UE 112 is now connected to a NR network, the UE is not expected to compile the NR capabilities subject to the capability size limit. Accordingly, the gNB will receive a UE capability message 419 with a full set of NR capabilities of the network. By the intermediary of the received UE capability message, the gNB may further adjust the configuration for the UE to better suit the complete capability list.

Always enquiring with the UE 112 (e.g., in a routine manner) may be wasteful with radio resources and incur an unnecessary processing load on the enquiring gNB 160 and/or on the UE 112. This is efficiently avoided by the heuristics disclosed next, indeed since the gNB 160 may choose to transmit the renewed capability inquiry only if has a verifiable reason to believe that the NR capabilities are incomplete. Then, it will be justified for the gNB 160 to make a capability enquiry 417 to the UE 112, in particular, if the gNB 160 suspects that the reported NR capabilities which accompanied the UE 112 at handover is an incomplete set of capabilities, as a result of a past size reduction to meet the capability size limit. The greater the mismatch between the UE's full capabilities and the allowed capability message size is, the more the network 152 will be blind to the UE's true capabilities, and the higher will the risk be that the network 152 configures the UE 112 with a suboptimal configuration. A representative example would be that the network 152 ignores the UE's 112 true support for carrier aggregation and configures UE with fewer carriers than the UE actually supports.

In some embodiments, assessing 416 whether the NR capabilities are less than a full set of NR capabilities comprises determining that the NR capabilities are less than a full set of NR capabilities of the UE in response to finding that their size is less than or equal to a capability size limit and their size is greater than 90% of the capability size limit. Alternatively, the gNB may determine that the NR capabilities are less than a full set of NR capabilities if it finds that their size is less than or equal to a capability size limit and their size is greater than 95% of the capability size limit. The narrower interval [95%, 100%] may be preferable if it is known that the UE 112 can remove capability items (e.g., features, feature groups) with a fine granularity; the broader interval [90, 100%] will lead to a greater total number of capability enquiries 417—possibly including some 'false positives'—but this could be considered acceptable in the interest of avoiding suboptimal configurations that ignore the UE's true capabilities. Further options are possible as well, such as [80%, 100%], [85%, 100%] and [98%, 100%]. Under each option, the capability size limit corresponds to a supported size of a container in a handover message 413 sent on an inter-RAT interface between EPC and 5GC. The capability size limit can be chosen in the various ways discussed above.

In other embodiments, assessing 416 whether the NR capabilities are less than a full set of NR capabilities comprises assessing whether the UE has applied one of the rules in Examples 1-16 in order to include 405.2 less than the full set of NR capabilities in the compiled list of NR capabilities. This assessment may comprise determining whether the NR capabilities are incomplete with respect to a pre-agreed list of corresponding BCs (Example 1), e.g., the NR capabilities form a truncated or prematurely interrupted list in relation to the pre-agreed list of BCs. Further this assessment may comprise determining whether an inclusion rule or an exclusion rule has been applied (Examples 2-16). Having applied an inclusion rule may manifest itself in such manner that capabilities corresponding to a certain category of BCs indicated by the rule (e.g., UL TX switching BCs, as in Example 2) are present in their entirety, while other BC categories are fully or partially absent in the reported capabilities. Having applied an exclusion rule may manifest itself in such manner that capabilities corresponding to a certain category of BCs indicated by the rule (e.g., band combinations relevant in the PLMN region, as in Example 4) are entirely absent, while other BC categories are fully or partially present in the reported capabilities. In each of these cases, the gNB 160 may decide to transmit a UE capability enquiry message 417 to the UE 112.

It is noted that the procedures shown in FIGS. 4A and 4B, including the exchange of communications within the EUTRA network 102 and NR network 152, may be carried out substantially in the reverse order, so as to support an inter-RAT handover in the direction from NR to EUTRA. Common to what has been described above, the UE 112 includes its EUTRA capabilities only up to the capability size limit supported on the N26 interface 180, and the target gNB 160 may apply heuristics based on said capability size limit, in particular, to determine whether to transmit a UE capability enquiry message 417 to the UE 112.

In other words, according to the procedures described with reference to FIG. 4, when responding to a UECapabilityEnquiry in a source RAT (e.g. EUTRA), the UE may limit the capability container for a different target RAT (e.g. NR) to a size that is below what the N26 interface can handle, even if the Uu interface can handle a larger message size.

If the target gNB determines that the forwarded target RAT capability container has been reduced in size at an incoming inter-RAT handover, the target gNB may perform an additional UECapabilityEnquiry of the target RAT capability container.

The target gNB may determine whether the forwarded target RAT capability container has been reduced in size on source side by comparing the size of the received container with a threshold or by looking at an explicit indication provided from source RAT.

The method thus ensures that inter-RAT handover from EUTRA to NR can be performed for high-end UEs supporting many bands and band combinations where the UE's true capabilities would result in a capability container larger than the ~64 KB size which the N26 interface can handle.

At reception of the UECapabilityEnquiry message in the EUTRA RAT, the UE may ensure that the UE-NR-Capability container included in the corresponding UECapabilityInformation response message is limited to a size that is significantly smaller (i.e., 64 KB vs approximately 131 kB) than the maximum 16 RRC segment limitation that the Uu interface allows. Ensuring that the response message is smaller than the maximum size allows for transfer of the UE-NR-Capability container over the N26 interface with the applicable message headers. In one embodiment, the maximum size is expressed as a limitation in number of bytes, where the number of bytes is slightly below 65535 bytes which the N26 user datagram protocol (UDP) transport protocol is limited to, e.g., after subtracting space occupied by headers and other protocol elements. In another embodiment, the maximum size is expressed as a limitation in maximum number of RRC segments, where 6 RRC segments is the maximum size to achieve the same effect on N26 (i.e., it can be sent in the NR Transparent Container in the Forward Relocation Request message). In said other embodiment, it is possible to use 7 RRC segments (57316 byte in EUTRA) as the maximum size instead.

Figure 5:
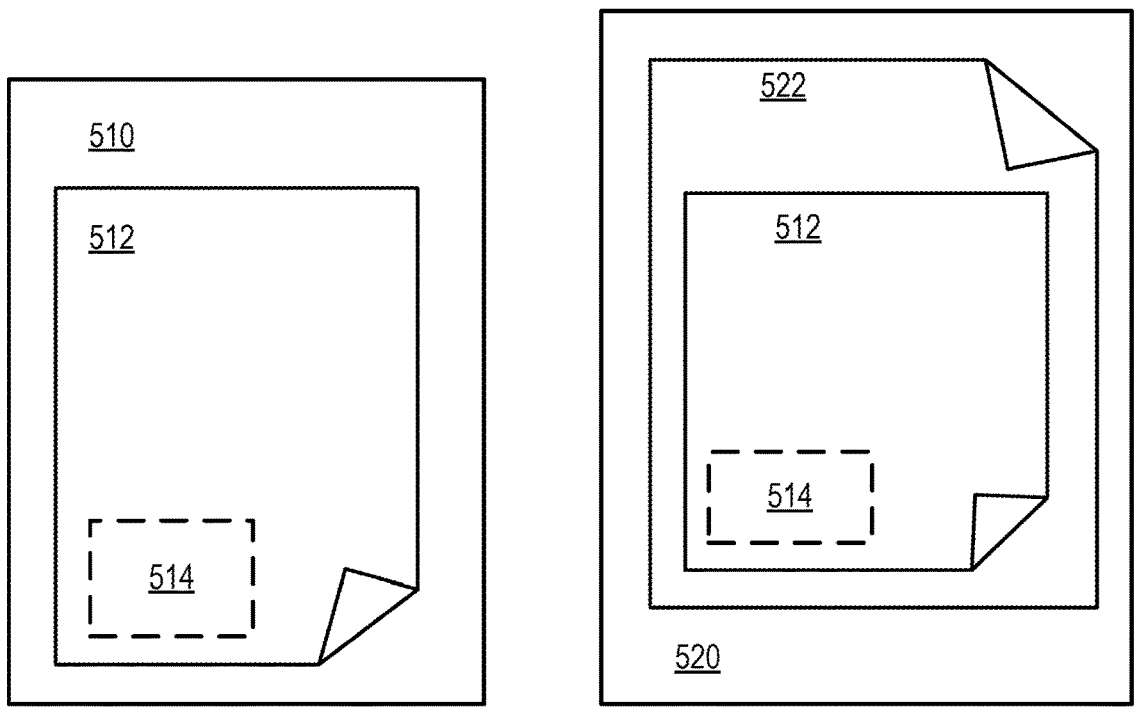
FIGS. 5 and 6 show messages which are exchanged among a user equipment, access network nodes and core network nodes within the two telecommunication networks.
Figure 6:
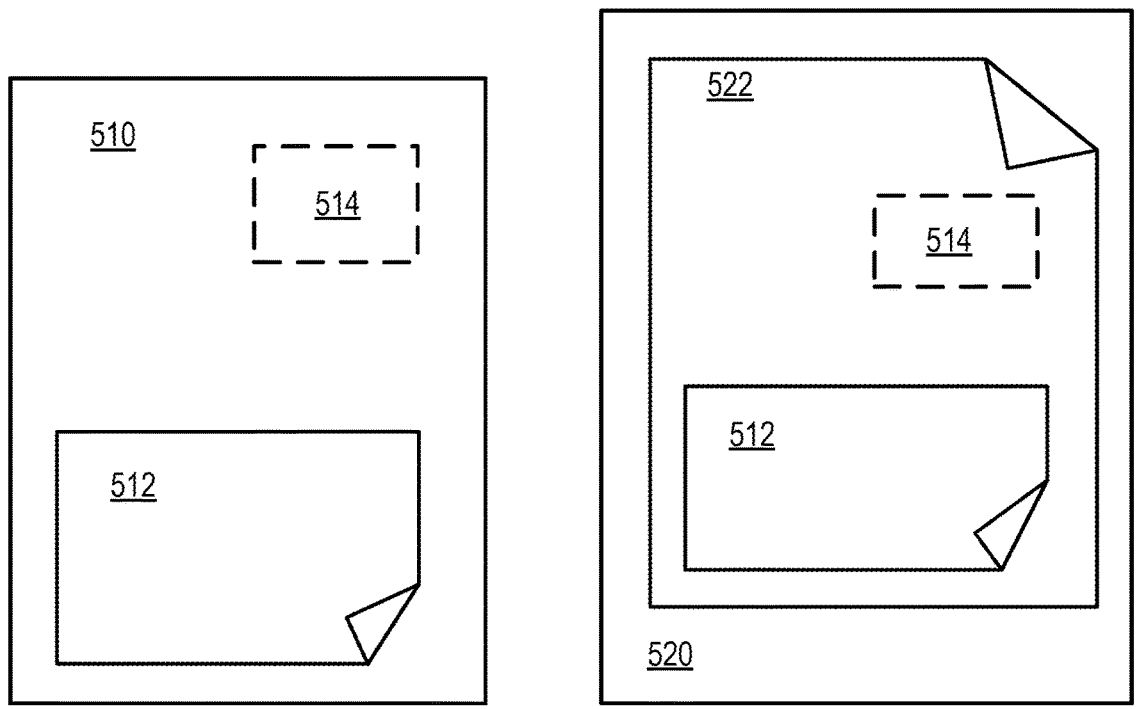

In an embodiment, the UE explicitly indicates if the UE-NR-Capability container has been reduced in size, or if the UE-NR-Capability container contains the full capabilities. In a first embodiment, this explicit indication comprises an information element within the UE-NR-Capability container. In a second embodiment, this explicit indication comprises an information element in the message carrying the UE-NR-Capability container. More precisely, when the UE 112 compiles the NR capabilities (step 405), the UE 112 may see itself required to include less than the full set of NR capabilities of the UE, and it then indicates this by associating (step 405.4) the compiled NR capabilities with an exclusion indicator 514 (see FIG. 5). One possible reason for including less than the full set of NR capabilities may be that the UE 112 has determined that the full set of NR capabilities of the UE would exceed a capability size limit. The exclusion indicator 514 may be a flag which is set to Boolean true or false depending on whether the full set of NR capabilities of the UE has been included. Alternatively, the exclusion indicator 514 may be a bit or another data structure which is present only if the full set of NR capabilities of the UE has been included (according to a first signaling convention) or only if the full set of NR capabilities of the UE has not been included (according to a second, alternative signaling convention). The exclusion indicator 514 may be associated with the NR capabilities by being included in an NR capability container (e.g., ue-CapabilityRAT-Container) together with the NR capabilities. Alternatively, the exclusion indicator 514 may be associated with the NR capabilities by being included in the one or more UE capability information messages 406, 407, though outside the NR capability container which contains the NR capabilities. FIG. 5 illustrates the first type of association, where number 510 indicates a simple message (e.g., UECapabilityInformation) in which the NR capability container 512 is carried directly, and number 520 indicates a complex message (e.g., Handover Required, Forward Relocation Request) in which the NR capability container 512 is carried inside a further container 522 (e.g., Source to Target Transparent Container, NR Transparent Container). It is seen that the exclusion indicator 514 is contained inside the NR capability container 512 each time. FIG. 6, where identical reference numbers are used as in FIG. 5, illustrates the second type of association between the exclusion indicator 514 and the NR capabilities. Here, the exclusion indicator 514 is provided outside the NR capability container 512 but inside the same message 510, 520. In the case of the complex message 520, the exclusion indicator 514 is in fact provided inside said further container 522.

The UE limits the UE-NR-Capability size only when NR stand-alone is supported in the network and the UE thus must be prepared for an inter-RAT handover from eNB to gNB. In case only EUTRA-NR dual connectivity (EN-DC) and no NR stand-alone is supported, the N26 limitation will not apply. The UE may determine the need to reduce the UE-NR-Capability size based on the information provided by eNB. In one embodiment the UE can determine based on the presence of system information block 24 (SIB 24) broadcast in the current E-UTRAN cell, i.e. a cell comprising EUTRA UEs and an eNB. If there is no SIB 24, inter-RAT handover to NR will not occur and there is no need to reduce the UE-NR-Capability. Alternatively, UE may determine from the presence of EUTRA-NR-only indication in UE capability enquiry message from eNB that inter-RAT handover to NR will not occur and there is no need to reduce the UE-NR-Capability. Further, if the UE does not include any NR band combination capabilities in the UE-NR-Capability container, the inter-RAT handover will not happen and therefore there is no need to reduce the UE-NR-Capability size.

In one embodiment, if the UE-NR-Capability received by the eNB is still larger than the N26 limitation, the eNB does not configure inter-RAT measurement on NR carriers to prevent any inter-RAT handover to NR. I.e., the eNB may enforce that the UE behavior is consistent with the UE-NR-Capability.

In the eNB, when initiating inter-RAT handover to NR and generating the message Handover Required, the eNB determines if the total size of the UE-NR-Capability and other capability containers (such as UE-EUTRA-Capability) will fit in a message that is small enough to not violate the N26 message size limitation. If the message size when including UE-NR-Capability and other capability containers is larger than the N26 message size limitation, then all the other capability containers or a subset of the other capability containers may be omitted from the message, making room for the mandatory UE-NR-Capability container.

The eNB may either determine whether the size of UE capability fits in the Source to Target Transparent Container immediately when sent by UE or before triggering the inter-RAT handover from EUTRA to NR.

In the gNB, at incoming inter-RAT handover, the gNB may determine if the received UE-NR-Capability container represents the full capability or if the received UE-NR-Capability container has been reduced in size by the UE in the source RAT.

In one embodiment, when an explicit indication of whether the container has been reduced in size or not has been included by the UE in the source RAT, this indication is used by the gNB to determine if size reduction applies or not.

In another embodiment where no explicit indication is available, the gNB will analyze the size of the UE-NR-Capability container to determine if size reduction applies or not. Said determination may be one of:

If container size, measured in bytes, is larger than a pre-determined value X, where X is a number smaller than 65535 bytes, size reduction applies;

If container size, measured in bytes, is larger than a configurable number of bytes, size reduction applies;

If container size, measured in number of RRC segments, is larger than a predetermined value Y, where Y is 7 or 6 or 5, size reduction applies; and/or If container size, measured in number of RRC segments, is larger than a configurable number of RRC segments, size reduction applies.

If the target gNB determines that container size reduction applies, the target gNB may initiate capability transfer procedure, and in the UECapabilityEnquiry message instruct the UE to include the UE-NR-Capability container in the UECapabilityInformation message. Hence the gNB obtains the full UE-NR-Capability container without unnecessary size restrictions, and the gNB may base further configuration decisions on the full capability information.

Similarly, when initiating inter-RAT handover in the other direction to NR, the UE may limit the size of UE-EUTRA-Capability to fulfill the size limitation on N26.

At inter-RAT handover from NR to LTE, the gNB may first determine the size of the UE-NR-Capability received from the UE (or received from access and mobility function, AMF), and then determine whether to send the UE-NR-Capability together with UE-EUTRA-Capability to the eNB. If the total capability size is larger than the N26 limitation, the gNB does not forward the UE-NR-Capability container.

Facilitating Inter-RAT Handover from EUTRA to NR and Vice Versa

As announced, the disclosed method may be performed during inter-RAT handovers in the other direction, i.e. from NR to EUTRA, including UE radio capability within the container up to what is supported on N26. In detail, the following is proposed.

E1. A capability transfer method implemented in a user equipment, UE (112), which is operable in first-RAT networks (102) and in second-RAT networks (152), the capability transfer method comprising:

compiling (404) first-RAT capabilities of the UE;
compiling (405) second-RAT capabilities of the UE; and
transmitting one or more UE capability information messages (406, 407) with the compiled first-RAT capabilities and second-RAT capabilities to a base station (110) in a first-RAT network, characterized in that the second-RAT capabilities are compiled (405) subject to a capability size limit, which corresponds to a supported size of a container in a handover message (413) sent on an inter-RAT interface (180) between a first-RAT core network (106) and a second-RAT core network (156).

E2. The capability transfer method of embodiment E1, wherein the capability size limit shall not apply to the first-RAT capabilities.

E3. The capability transfer method of embodiment E1 or E2, further comprising:
assessing (403) whether inter-RAT handover is enabled between the first RAT and the second RAT,
wherein the capability size limit shall apply only if inter-RAT handover is enabled.

E4. The capability transfer method of embodiment E3, further comprising:
receiving a SIB 24 block (401) from the base station,
wherein assessing (403) whether inter-RAT handover is enabled includes determining that inter-RAT handover is enabled in reaction to receiving the SIB 24 block.

E5. The capability transfer method of embodiment E3 or E4, further comprising:
receiving a UE capability enquiry message (402) containing configuration data specifying that second-RAT-only band combinations are to be excluded,
wherein assessing (403) whether inter-RAT handover is enabled comprises determining that inter-RAT handover is not enabled in reaction to said band combinations being excluded.

E6. The capability transfer method of any of the preceding embodiments, wherein compiling (405) the second-RAT capabilities comprises:
establishing (405.1) a full set of second-RAT capabilities of the UE; and
if the full set of second-RAT capabilities exceeds the capability size limit, including (405.2) less than the full set of second-RAT capabilities in the compiled second-RAT capabilities.

E7. The capability transfer method of embodiment E6, wherein compiling (405) the second-RAT capabilities further comprises:
if the full set of second-RAT capabilities does not exceed the capability size limit, including (405.3) the full set of capabilities in the compiled second-RAT capabilities.

E8. The capability transfer method of any of the preceding embodiments, further comprising:
compiling (418) a full set of second-RAT capabilities of the UE; and
transmitting an additional UE capability information message (419) with the compiled full set of second-RAT capabilities to a base station in a second-RAT network,
wherein the capability size limit shall not apply to the compiling of the full set of second-RAT capabilities.

E9. The capability transfer method of any of embodiments E6 to E8, further comprising:
receiving a UE capability enquiry message (402) containing configuration data relating to second-RAT operation,
wherein the full set of second-RAT capabilities is dependent on the configuration data.

E10. A capability transfer method implemented in a base station (110) in a first-RAT network (102), wherein the base station is operable to initiate an inter-RAT handover to a second-RAT network (152), the capability transfer method comprising:
receiving from a user equipment, UE (112), one or more UE capability information messages (406, 407) containing first-RAT capabilities; and
receiving from the UE one or more UE capability information messages (406, 407) containing second-RAT capabilities, characterized by assessing whether the one or more second UE capabilities exceed a capability size limit, which corresponds to a supported size of a container in a handover message (413) sent on an inter-RAT interface (180) between a first-RAT core network and a second-RAT core network; and
disabling (408) the inter-RAT handover in reaction to determining that the one or more second UE capabilities exceed the capability size limit.

E11. An inter-RAT handover method implemented in a base station (160) in a second-RAT network (152), the inter-RAT handover method comprising:
completing a handover (415) of a user equipment, UE (112) to the base station from a first-RAT network (102);
receiving from a core network node in the second-RAT network a message (414) containing second-RAT capabilities of the UE;
assessing (416) whether the second-RAT capabilities are less than a full set of second-RAT capabilities of the UE;
if the second-RAT capabilities are less than a full set of second-RAT capabilities of the UE, transmitting a UE capability enquiry message (417) to the UE; and
receiving one or more UE capability information message (419) containing second-RAT capabilities of the UE.

E12. The inter-RAT handover method of embodiment E11, wherein assessing (416) whether the second-RAT capabilities are less than a full set of second-RAT capabilities of the UE comprises:
determining that the second-RAT capabilities are less than a full set of second-RAT capabilities of the UE in reaction to finding that their size is less than or equal to a capability size limit and their size is greater than 90% of the capability size limit, preferably greater than 95% of the capability size limit,
wherein the capability size limit corresponds to a supported size of a container in a handover message (413) sent on an inter-RAT interface (180) between a first-RAT core network (106) and a second-RAT core network (156).

E13. The method of any of the preceding embodiments, wherein the capability size limit is at most 65535 bytes.

E14. The method of any of the preceding embodiments, wherein the capability size limit is at most 6 times the size of one Radio Resource Control, RRC, segment, preferably at most 5 times the size of one RRC segment.

E15. The method of any of the preceding embodiments, wherein the capability size limit is at most 7 times the size of one Radio Resource Control, RRC, segment, preferably at most 6 times the size of one RRC segment.

E16. The method of any of the preceding embodiments, wherein the handover message (413) sent on an inter-RAT interface (180) between a first-RAT core network (106) and a second-RAT core network (156) is a Forward Relocation Request message.

E17. The method of embodiment E16, wherein the container in the handover message (413) is a transparent container.

E18. A user equipment (112), which is operable in first-RAT networks (102) and in second-RAT networks (152), and configured to perform the capability transfer method of any of embodiments E1 to E9.

E19. A base station (110), which is operable in a first-RAT network (102) and configured to perform the capability transfer method of embodiment E10

E20. A base station (160), which is operable in a second-RAT network (152) and configured to perform the inter-RAT handover method of embodiment E11 or E12.

E21. A computer program, comprising instructions that, when executed by processing circuitry (202, 302), cause the processing circuitry to carry out the method according to any of embodiments E1 to E17.

E22. A computer-readable medium storing the computer program of embodiment E21.

E23. The method, user equipment, base station, core network node, computer program or computer-readable medium of any of the preceding embodiments, wherein the first RAT is NR and the second RAT is EUTRA.

E24. The method, user equipment, base station, core network node, computer program or computer-readable medium of any of the preceding embodiments, wherein the first RAT is EUTRA and the second RAT is NR.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method of operating a user equipment ("UE") that is operable in Evolved Universal Mobile Telecommunications System Terrestrial Radio Access ("EUTRA") networks and in new radio ("NR") networks, the capability transfer method comprising:
   compiling EUTRA capabilities of the UE;
   compiling NR capabilities of the UE; and
   transmitting one or more UE capability information messages with the compiled EUTRA capabilities and NR capabilities to a base station in an EUTRA network, characterized in that the NR capabilities are compiled subject to a capability size limit, which corresponds to a supported size of a container in a handover message sent on an inter-radio access technology ("RAT") interface between Evolved Packet Core and Fifth Generation ("5G") Core.

2. The method of claim 1, wherein the capability size limit shall not apply to the EUTRA capabilities.

3. The method of claim 1, further comprising:
   assessing whether inter-RAT handover is enabled between EUTRA and NR,
   wherein the capability size limit shall apply only if inter-RAT handover is enabled.

4. The method of claim 3, further comprising:
   receiving a SIB 24 block from the base station,
   wherein assessing whether inter-RAT handover is enabled includes determining that inter-RAT handover is enabled in reaction to receiving the SIB 24 block.

5. The method of claim 3, further comprising:
   receiving a UE capability enquiry message containing configuration data specifying that NR-only band combinations are to be excluded,
   wherein assessing whether inter-RAT handover is enabled comprises determining that inter-RAT handover is not enabled in reaction to NR-only band combinations being excluded.

6. The method of claim 1, wherein compiling the NR capabilities comprises:
   establishing a full set of NR capabilities of the UE; and
   if the full set of NR capabilities exceeds the capability size limit, including less than the full set of NR capabilities in the compiled NR capabilities.

7. The method of claim 6, wherein including less than the full set of NR capabilities in the compiled NR capabilities comprises:
   including capabilities corresponding to an ordered list of band combinations until the capability size limit is attained.

8. The method of claim 6, wherein including less than the full set of NR capabilities in the compiled NR capabilities comprises at least one of:
   applying an inclusion rule, by which capabilities corresponding to a certain category of band combinations shall be included, and
   applying an exclusion rule, by which capabilities corresponding to a certain category of band combinations shall be excluded.

9. The method of claim 6, wherein compiling the NR capabilities further comprises:
   verifying that the full set of NR capabilities does not exceed the capability size limit and, if so, including the full set of capabilities in the compiled NR capabilities.

10. The method of claim 1, further comprising:
    compiling a full set of NR capabilities of the UE; and
    transmitting an additional UE capability information message with the compiled full set of NR capabilities to a base station in an NR network,
    wherein the capability size limit shall not apply to the compiling of the full set of NR capabilities.

11. The method of claim 6, further comprising:
    receiving a UE capability enquiry message containing configuration data relating to NR operation,
    wherein the full set of NR capabilities is dependent on the configuration data.

12. The method of claim 1, wherein the capability size limit is at most 65535 bytes.

13. The method of claim 1, wherein the capability size limit is at most 6 times the size of one Radio Resource Control ("RRC") segment, preferably at most 5 times the size of one RRC segment.

14. The method of claim 1, wherein the capability size limit is at most 7 times the size of one Radio Resource Control ("RRC") segment, preferably at most 6 times the size of one RRC segment.

15. The method of claim 1, wherein the handover message sent on the inter-RAT interface between Evolved Packet Core and 5G Core is a Forward Relocation Request message.

16. The method of claim 1, wherein the container in the handover message is a NR Transparent Container.

17. A user equipment ("UE") that is operable in Evolved Universal Mobile Telecommunications Systems ("EUTRA") networks and in new radio ("NR") networks, the UE comprising:
    processing circuitry; and
    memory coupled to the processing circuitry and having instructions stored therein that are executable by the processing circuitry to cause the UE to perform operations comprising:

compiling EUTRA capabilities of the UE;

compiling NR capabilities of the UE; and transmitting one or more UE capability information messages with the compiled EUTRA capabilities and NR capabilities to a base station in an EUTRA network, characterized in that the NR capabilities are compiled subject to a capability size limit, which corresponds to a supported size of a container in a handover message sent on an inter-radio access technology ("RAT") interface between Evolved Packet Core and Fifth Generation ("5G") Core.

18. The UE of claim 17, wherein the capability size limit shall not apply to the EUTRA capabilities.

19. The UE of claim 17, the operations further comprising:

assessing whether inter-RAT handover is enabled between EUTRA and NR, wherein the capability size limit shall apply only if inter-RAT handover is enabled.

20. A non-transitory computer readable medium having instructions stored therein that are executable by processing circuitry of a user equipment ("UE") to cause the UE to perform operations, the UE operable in Evolved Universal Mobile Telecommunications System Terrestrial Radio Access ("EUTRA") networks and in new radio ("NR") networks, the operations comprising:

compiling EUTRA capabilities of the UE;

compiling NR capabilities of the UE; and transmitting one or more UE capability information messages with the compiled EUTRA capabilities and NR capabilities to a base station in an EUTRA network, characterized in that the NR capabilities are compiled subject to a capability size limit, which corresponds to a supported size of a container in a handover message sent on an inter-radio access technology ("RAT") interface between Evolved Packet Core and Fifth Generation ("5G") Core.

* * * * *